(12) United States Patent
Schmideg et al.

(10) Patent No.: US 6,826,980 B2
(45) Date of Patent: Dec. 7, 2004

(54) DRIVE AND CONTROL SYSTEMS FOR HIGH SPEED INTERMITTENT MOTION GENERATIONS, CONTROL AND APPLICATIONS

(76) Inventors: George Schmideg, deceased, late of Toronto (CA); by Miriam Schmideg, legal representative, 37 Brockington Crescent, Toronto, Ontario (CA), M3H 4S9

( * ) Notice: Subject to any disclaimer, the term of this patent is extended or adjusted under 35 U.S.C. 154(b) by 0 days.

(21) Appl. No.: 09/985,538

(22) Filed: Nov. 5, 2001

(65) Prior Publication Data

US 2003/0084737 A1 May 8, 2003

(51) Int. Cl.⁷ .............................................. F16H 53/06
(52) U.S. Cl. ...................... 74/569; 74/567; 74/568 R; 74/570
(58) Field of Search .................. 700/95, 160, 206, 700/301, 302; 74/567, 569, 388, 568 R, 570; 83/530, 617, 630, 628, 602; 415/61.1, 61.3

(56) References Cited

U.S. PATENT DOCUMENTS

| | | |
|---|---|---|
| 428,319 A | 5/1890 | Prentiss |
| 646,287 A | 3/1900 | Hundhausen |
| 658,556 A | 9/1900 | Pitt |
| 3,183,756 A | 5/1965 | Dehn |
| 3,771,403 A | 11/1973 | Meyer |
| 3,795,168 A | 3/1974 | Spachner et al. |
| 3,817,139 A * | 6/1974 | Desai et al. ................... 83/617 |
| 4,036,185 A * | 7/1977 | Key ......................... 123/90.25 |
| 4,172,401 A | 10/1979 | Terrado Albareda |
| 4,463,642 A | 8/1984 | Minato et al. |
| 4,630,516 A | 12/1986 | Koch et al. |
| 4,660,452 A | 4/1987 | Leinhaas |
| 4,811,699 A * | 3/1989 | Shiomi et al. ........... 123/90.23 |
| 5,253,546 A * | 10/1993 | Elrod et al. .................... 74/567 |
| 5,337,623 A * | 8/1994 | Huang et al. .............. 74/813 R |
| 5,527,053 A * | 6/1996 | Howard ........................ 280/90 |
| 5,732,453 A | 3/1998 | Dilo et al. |
| 5,823,087 A | 10/1998 | Eigenmann |

\* cited by examiner

*Primary Examiner*—Leo Picard
*Assistant Examiner*—Carlos R. Ortiz Rodriguez
(74) *Attorney, Agent, or Firm*—Robert A. Wilkes; Shapiro Cohen

(57) ABSTRACT

The present invention seeks to provide a system for high speed intermittent motion. The system consists of one or more intermittent motion generators. Each motion generator consists of a first and a second drive system with each drive system having its own control software and control input information received from a programmable logic controller (PLC). Each motion generator employs dual cams with fixed angular rotation. The dual cam combination consists of a first cam nested within a second cam. The dual cams permit independent and individual motion generation for each motion generator. The angular rotation of the second cam relative to the angular rotation of the first cam causes a linear displacement which generates intermittent linear motion for each individual motion generator.

6 Claims, 8 Drawing Sheets

DRIVE AND CONTROL SYSTEMS FOR HIGH SPEED INTERMITTENT MOTION GENERATIONS, CONTROL AND APPLICATIONS

FIELD OF INVENTION

This invention relates to a drive and control system employing dual cams to produce high speed intermittent motion. More particularly, this invention relates to a drive system generator consisting of one or more intermittent motion generators, controlled by a programmable logic controller.

BACKGROUND TO THE INVENTION

Intermittent motion generation is useful in cutting, shearing, or pressing machines. Intermittent motion is also useful where intermittent strokes are required. Processes such as cutting to length sheet metal use this type of stroke. The cutting strokes are generated by a combination of driving means coupled to a rotating camshaft, which is in turn coupled to a Pitman arm, or a ram attached either to shears or to a press. Most current drive systems employed for sheet metal processing equipment operate on the principle of stopping the assembly of the camshaft, Pitman arm and ram after each operating cycle. This means that the camshaft will rotate precisely 360° after each stroke. There can be various reasons for requiring the stopping and starting of these angular cycles. One of these is to ensure not only accurate indexing requirements but also the repeatability of the motion after each stroke. Although some of the current equipment does perform well, the number of strokes are still subject to the start-stop cycle. The stop and start cycle hinders the intermittent motion rotary system that carries all the associated high cyclic inertia loads. In addition, the stroke displacement of the machine is restricted to a single cam motion. In order to generate intermittent motion at higher speeds, the drive system must run at a higher rate of revolutions per minute (RPM).

The present invention seeks to overcome the above shortcomings by providing a system for intermittent motion generation using a dual cam arrangement to increase the speed of motion generated.

SUMMARY OF THE INVENTION

The present invention seeks to provide a system for high speed intermittent motion. The system consists of one or more intermittent motion generators. Each motion generator may function independently of the others and may be controlled by a programmable logic controller (PLC). Each motion generator consists of a first and a second drive system with each drive system having its own control software and control input information received from the PLC. Each motion generator employs dual cams with fixed angular rotation. The dual cam combination consists of a first cam nested within a second cam. The dual cams permit independent and individual motion generation for each motion generator. The use of dual cams enables the system to generate different linear strokes for each generator. The angular rotation of the second cam relative to the angular rotation of the first cam causes a linear displacement which generates intermittent linear motion for each individual motion generator. The second drive system is considerably smaller than the first drive system, since the second drive train and second motor are used only for adjustments. The overall smaller system allows for an advantageously faster response time and better motion control.

The applications of the present invention are diverse. The drive system may be applied to many high-speed mechanical functions, including high-speed shearing, and pressing, packaging lines, and textile manufacturing.

In a first aspect, the present invention provides a system for intermittent motion generation for a cam follower, the system including:
(a) a first cam coupled to a first driving means, the first cam rotating about a first fixed axis;
(b) a second cam coupled to a second driving means, the second cam rotating about a second axis, the second cam having a cam-shaped cavity with the first cam being nested within the cavity;
(c) a cam follower having one end in contact with the second cam, the cam follower being linearly displaced due to an intermittent linear motion generated by a rotation of the second cam relative to a rotation of the first cam.

In a second aspect, the present invention provides a drive system for generating intermittent motion, the drive system including:
(a) first driving means;
(b) first output shaft rotatably driven by the first driving means;
(c) second driving means coupled to the first driving means;
(d) at least two cams, the at least two cams including:
   (d1) a first cam rigidly mounted onto the first output shaft and having a cam-shaped outer surface;
   (d2) a second cam having a cam-shaped inner surface, the second cam being mounted onto the first cam by radial bearing means, the radial bearing means being seated between the cam-shaped outer surface of the first cam and the cam-shaped inner surface of the second cam, the second cam being rotated by the second driving means;
(e) a cam follower in contact with the outer surface of the second cam, the cam follower being displaced linearly by the intermittent linear motion generated from a relative rotation of the at least two cams.

BRIEF DESCRIPTION OF THE DRAWINGS

The invention will now be described with reference to the drawings, in which.

DETAILED DESCRIPTION

Figure 1:
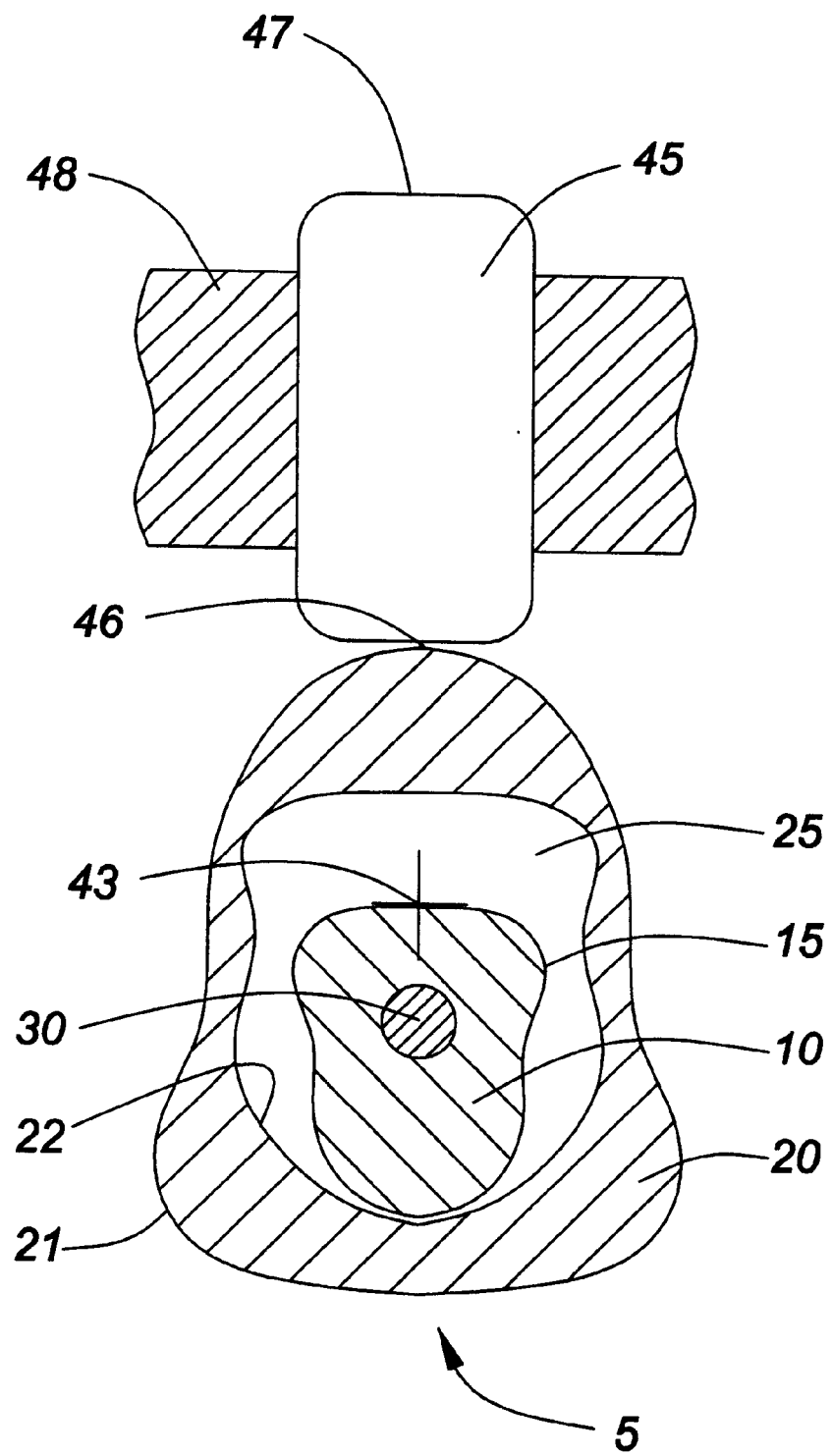
FIG. 1 shows a front view of a dual cam arrangement for generating intermittent motion according to the present invention.
Figure 2:
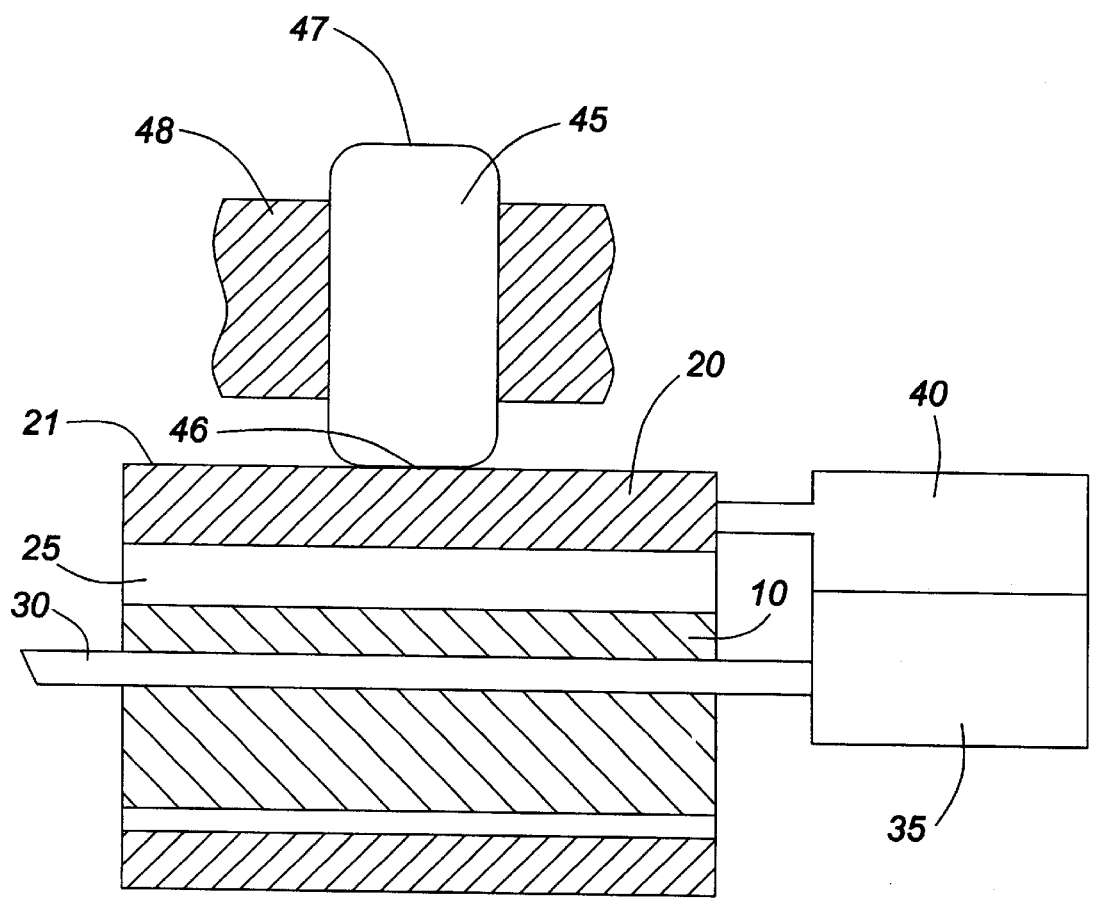
FIG. 2 shows a side view of a dual cam arrangement for generation intermittent motion according to the present invention.

The intermittent motion generator employing dual cams of this invention will be described with reference to FIGS. 1 and 2. The dual cam arrangement 5 consists of a first, inner, cam 10 and a second, outer, cam 20. Each cam is driven by independent driving means. The first cam 10 is nested within the cavity 25 of the second cam 20. The first cam 10 has an outer cam-shaped surface while the second cam 20 has both an inner and an outer cam-shaped surface. The contact between the outer surface 15 of the first cam 10 and the inner surface 22 of the second cam 20 varies as one cam rotates faster relative to the other. The first cam is keyed and mounted on a first drive output shaft 30. The first drive output shaft is driven by a first drive system. Thus, the first cam 10 rotates at an angular velocity that is dictated by the angular velocity on the first drive output shaft 30. A second drive system 40 is also connected to the second cam 20 through a second drive output shaft (not shown). The second drive system, coupled to known gear means, is able to rotate the second drive shaft at various angular velocities. By rotating the second drive output shaft, the second cam is thereby rotated at angular velocities similar to that of the second drive shaft. While the first cam 10 rotates around the centre axis of the main drive shaft, the second cam has a different rotational axis 43. This rotational axis will vary depending on the angular rotation of the first cam relative to the second cam.

Both the first cam and the second cam must rotate at different velocities in order to vary the resulting displacement due to the combined cams. The displacement of the dual cams permit a cam follower 45, in contact at its end 46 with the outer surface 21 of the second cam 20, to produce an intermittent linear motion at the upper end 47 of the cam follower 45. If both the first and second cams 10, 20 accelerate and rotate at the same angular velocity, then the relative angular rotation remains unchanged. Based on the velocity differential between the first and the second cam, the combined linear displacement may be doubled due to the difference in rotation. It should be mentioned that the set of first and second cams must provide equivalent angular rotation in that the cam shape of both the first cam and the second cams 10, 20 are the same but are differently sized. The resemblance between the shapes of the two cams allows the doubling of the linear displacement of the cams. As shown in both FIG. 1 and FIG. 2, a cam follower 45 is in contact at one end of the second cam 20 and is positioned within a bearing 48 for a cam follower. At the other end of the cam follower 45, intermittent linear motion is also generated. The linear displacement results from the angular rotation of the dual cams. The cam follower 45 may be embodied as or attached to either a Pitman arm or a ram and coupled with shears or a press.

Figure 3:
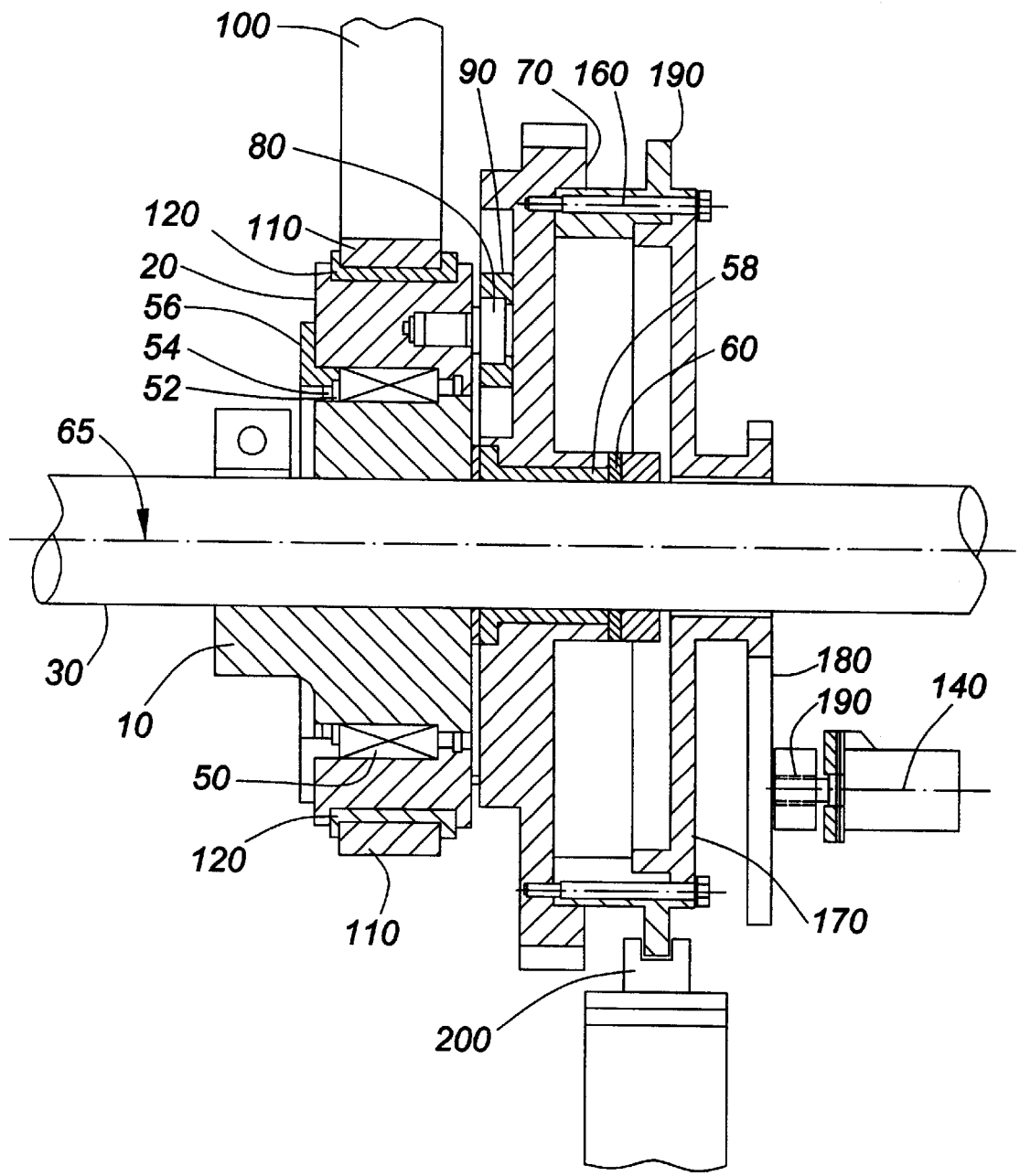
FIG. 3 shows a dual cam and drive arrangement according to one embodiment of the present invention.

The present invention may be further embodied in a mechanical drive system that generates intermittent linear motion. Again, the intermittent motion is generated through the use of dual cams having a combined fixed angular rotation. By utilizing the dual cams for intermittent motion generation, the drive system does not require full stopping and starting after each revolution. Consequently, the inertia loads carried on the system are substantially reduced. FIG. 3 illustrates a dual cam assembly within a drive system. The first cam 10 is rigidly mounted and keyed to the first drive output shaft 30. The first drive output shaft 30 is driven at a continuously rotating fixed RPM, using a dedicated drive train, powered by an electric or hydraulic motor. The second cam 20 is mounted onto the first cam 10. A radial bearing 50 supports the second cam 20, as it rides on the first cam. The radial bearing 50 is coupled to a retaining ring 52 which in turn is coupled to a radial gear 54. The retaining ring 52 supports the radial bearing 50. A retaining disk 56 is also coupled to the second cam 20 and the radial gear 54 in order to drive the second cam 20. Plain sleeve bearings 58 and 60 with washers are utilized to mount this second cam onto the first cam. A roller or a needle bearing with side restraining bronze disks may also be used instead of the bearings 58, 60. The radial bearing 50 between the cams is seated on the outer cam surface of the first cam 10 and is in contact with the inner surface of the second cam 20.

The fixed starting point for rotation of the first cam 10 is a predetermined point along the outer cam surface of the first cam 10 chosen according to the required linear motion to be actuated. Upon start up of the drive system, the predetermined starting point for rotation of the second cam 20 should be adjacent the starting point of the first cam 10, such that the respective starting points of the first and the second cams are the neutral orientations at the beginning of each cycle. While the drive system is in operation, the combined angular rotation of both the first cam 10 and the second cam 20 varies within a cycle but returns to the original starting point after a full rotation of the cams. The angular rotation of the first cam 10 is relative to the first shaft centerline axis 65. The angular rotation of the second cam is relative a second axis which varies since the second axis is dependent on the angular rotation of the first cam. When the angular rotation of the second cam 20 relative to the angular rotation of the first cam 10 is greatest, then the combined linear displacement of the dual cam is either zero or twice the linear displacement of a single cam.

The second cam 20 is an independently driven cam. It receives its drive torque and angular rotational velocity through a helical driven gear 70, which is independently mounted on and coaxial with the first drive output shaft 30. This driven gear 70 is supported by bearings 58, 60 onto the first drive output shaft 30. The drive provision from the driven gear 70 to the second cam 20 is a radially located cam follower 80 attached to the side of the second cam 20. A cam follower 80 is employed at the driven gear 70, using a drive dog 90 to transfer the radial load from the driven gear 70 to the cam follower 80. The cam follower 80 and its drive dog 90 will also move radially in or out. The machined slotted pocket in the driven gear 70 allows the drive dog 90 to move in or out during the relative rotation of the second cam.

A Pitman arm 100 is mechanically linked to the external surface of the second cam 20, using conventional attachment techniques. Between the second cam 20 and the Pitman arm 100, a bearing is employed to carry radial loads. This bearing can be either an anti-friction or plain type bearing. The bearing 110 supports the Pitman arm through use of a Pitman arm hub 120. The split bearing 110 is mounted on the external cylindrical surface of the second cam 20. As the first cam and second cam rotate differentially, the Pitman arm at the end in contact with the second cam will produce a cam motion. At the other end of the Pitman arm there may be attached a slide through which the desired intermittent motion is generated.

The dual cam is utilized to generate intermittent linear motion while the drive system is in a continuous rotary mode. At the starting position, the angular rotation of the second cam is such that the combined linear displacement of the pair is equal to zero about the axis of the first drive output shaft. If both the first and second cams rotate at an equal angular velocity, the relative angular rotation will remain at zero and as such, the intermittent linear motion is not generated. If however, the second cam drive gear angular velocity changes, then there will be a relative angular rotation between the pair. As the angular rotation of the second cam 20 increases relative to its own starting point and that of the first cam, the linear displacement of the pair will increase. At a given point in the relative rotation of the second cam 20 with respect to the first cam 10, the combined linear displacement of the first and second cam will double. As well, the Pitman arm 100, at that given point, will attain its maximum linear displacement.

While the drive system is in operation, an encoder 140 monitors the relative velocity of the second cam 20. In order to monitor the second cam, a spur gear 150 is coupled to the driven gear 70 of the second cam 10 through a pin 160. The teeth of the spur gear 150 engage with those of the precision spur gear 180. The precision spur gear 180 is coupled to the encoder 140 through a mounting clamp 190. The encoder 140 is then able to measure the rotational velocity directly from the precision spur gear 180.

A brake disk 190 is attached to the driven gear 70 through the pin 160. Prior to shutting down both the first and second drive system (not shown), the caliper brake 200 must be activated. The caliper brake 200 stops the rotation of the brake disk 190 through friction caused by the clamping of the caliper brake 200 on the brake disk 190.

Figure 4:
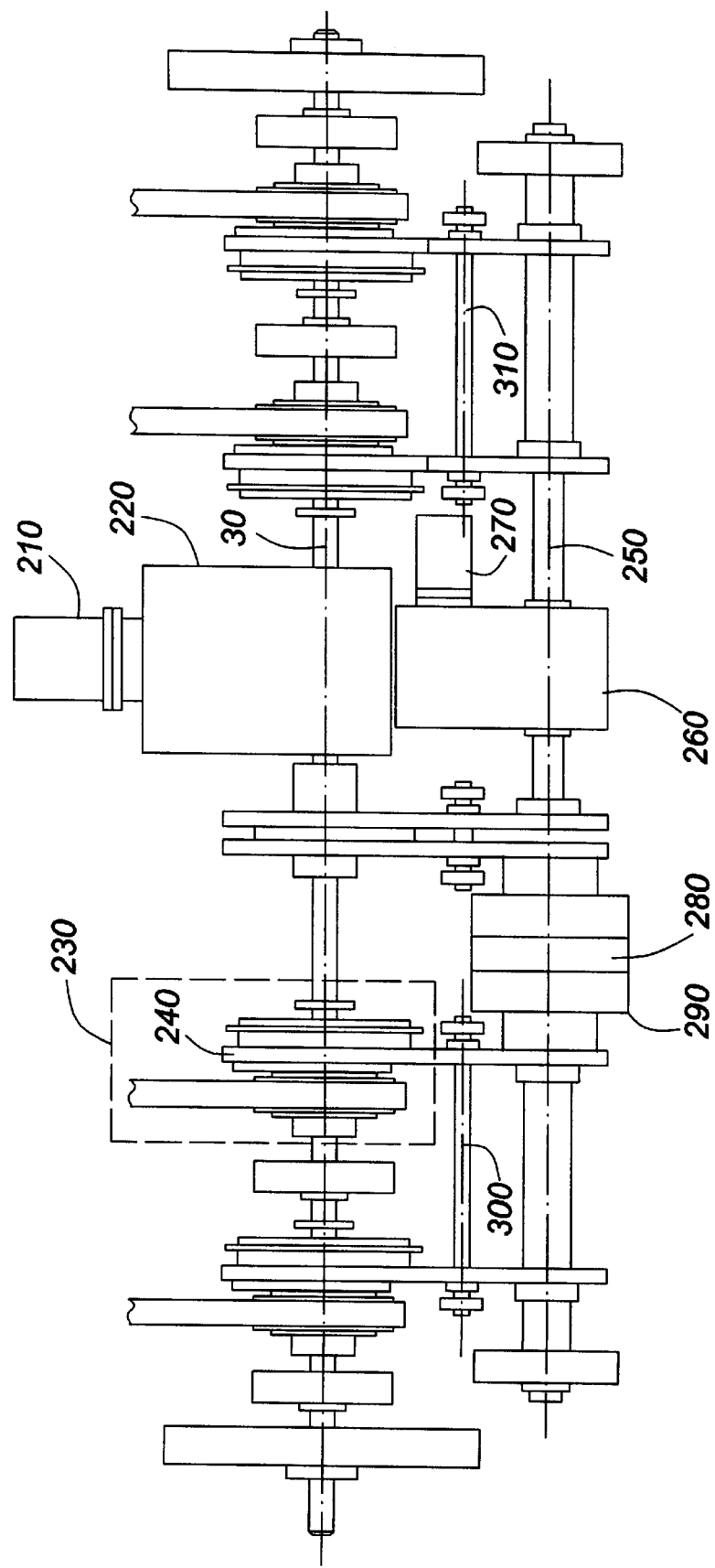
FIG. 4 shows a multiple dual cam used in a drive arrangement according to a third embodiment of the present invention.

FIG. 4 illustrates a possible drive configuration where multiple dual cams are utilized. A first drive motor 210 drives the first drive output shaft 30 through the drive gear box 220. The block 230 is the drive configuration as described in FIG. 3. In this expanded drive configuration, all first cams are mounted and keyed to the first output shaft 30. The second cams are coupled to a spur gear 240 which is driven by the second output drive shaft 250. The second output shaft is coupled to the second gearbox 260. The second drive motor 270 drives the second output drive shaft 250 through the second gearbox 260. A roller clutch 280 and drive hub 290 is connected to the spur gear 240. This connection enables the roller clutch to adjust the rotational speed of the second cam. The intermediate shaft 300 permits two separate drive arrangements to generate intermittent motion at equivalent speeds. To the right of the first drive motor, another two drive arrangements are shown. With these drive arrangements, the second output drive shaft is not coupled to a roller clutch 280, rather the intermediate shaft 310 synchronizes the intermittent motion generated by both drive arrangements that are to the right of the first drive motor 210 in FIG. 4.

Figure 5:
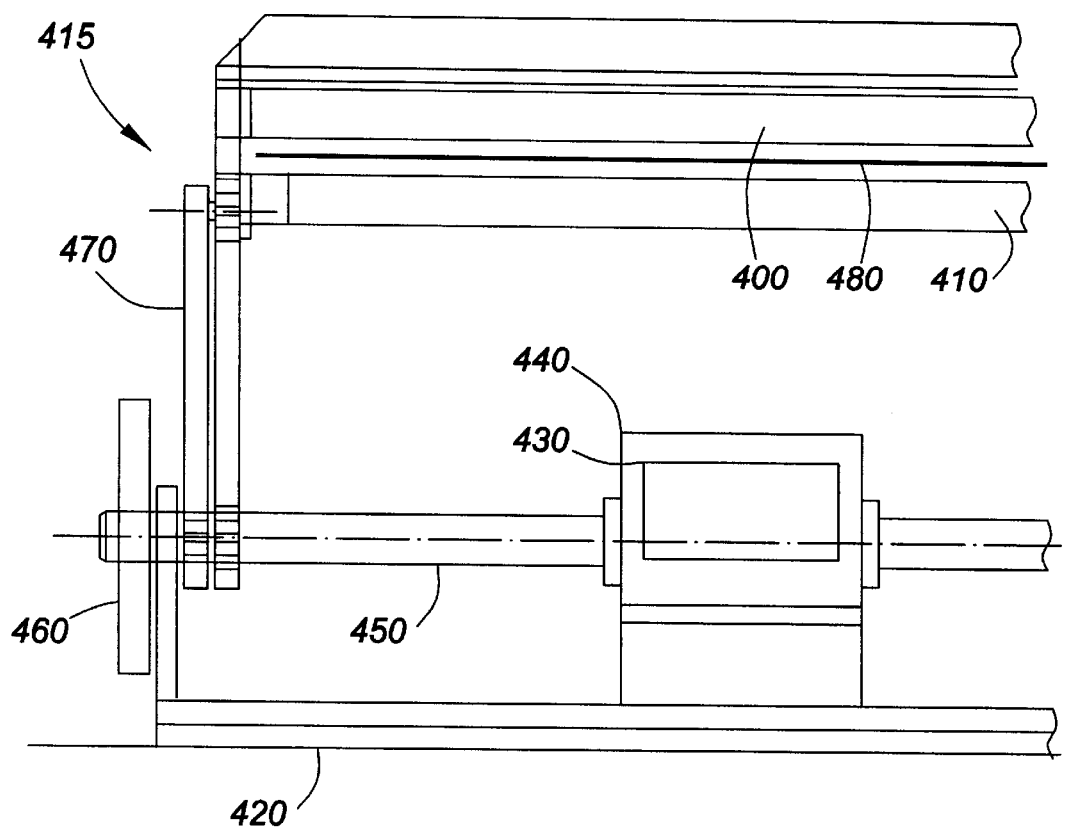
FIG. 5 shows a front view of a sheet metal shearing system implementing the drive system of the present invention.
Figure 6:
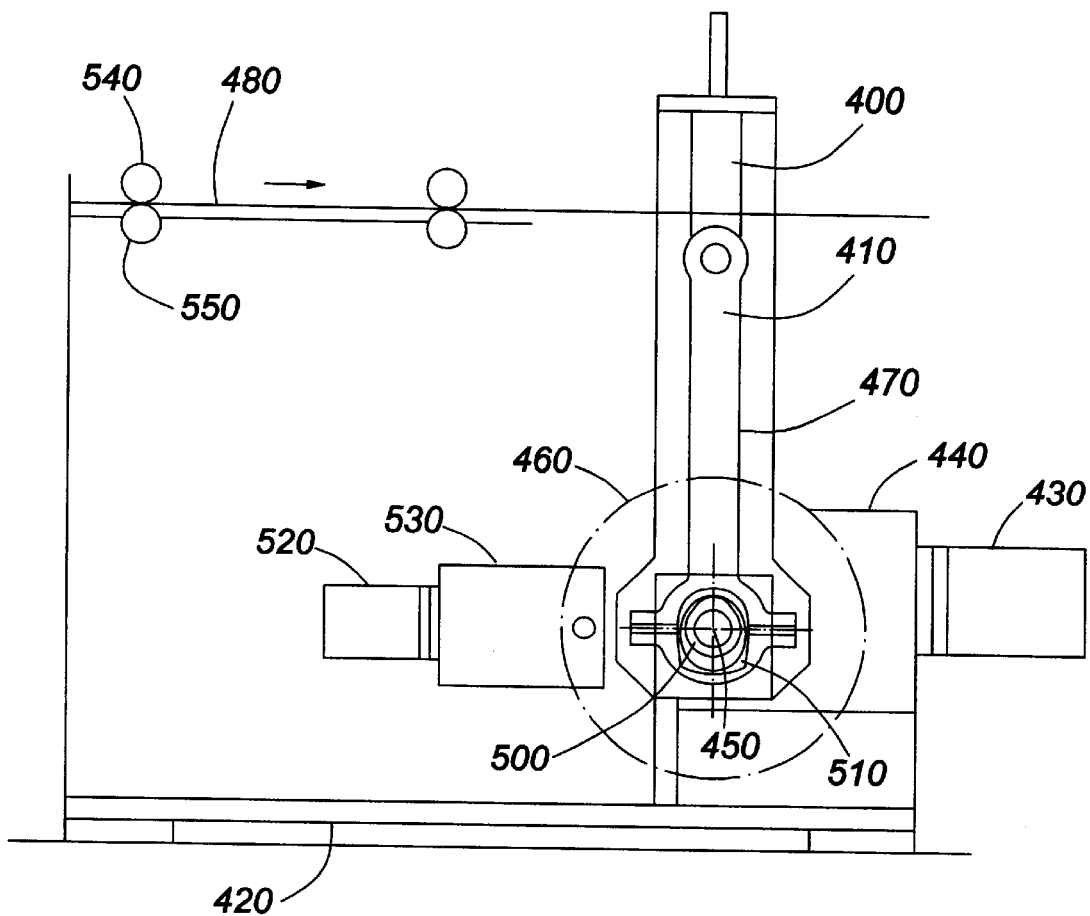
FIG. 6 shows a side view of the sheet metal shearing system implementing the drive system of the present invention.

FIGS. 5 and 6 illustrate one possible application of the present invention in a sheet metal shearing system. The drive system performs high speed cutting for the shears used for cutting to length metal sheets, the shears comprising an upper shear 400 and a lower shear 410. FIG. 5 is a front view of the shearing system 415. The shear frame 420 rests on the floor of a production facility and supports the system. In FIG. 6, the first drive motor 430 and first drive gearbox 440 are coupled to the first output shaft 450. The flywheel 460 is also attached to the first outputs shaft 450 and is utilized to regulate the rotational speed of the first output shaft 450. The Pitman arm 470 which is coupled to the dual cam (not shown), specifically the outer surface of the second cam, is linked to the shears 400, 410. Linkage (not shown) couples the Pitman arm 470 to the lower shear 410. The intermittent motion generated by the dual cams coupled to the shaft 450 drives the lower shear 410, in combination with the upper shear 400, to cut the sheet metal 480.

FIG. 6 illustrates the side view of the shearing system. In this view, the first cam 500 and the second cam 510 are shown. The second cam is driven by the second drive motor 520 through the second gearbox 520. As the cams rotate at different velocities relative to each other, the Pitman arm 470 generates intermittent linear motion. The linear motion produced by the Pitman arm slides the lower shear 410 into the upper shear 400 thereby shearing the sheet metal. The sheet metal itself flows towards the shears and is driven by a pressure roller 540 and a support roller 550.

Figure 7:
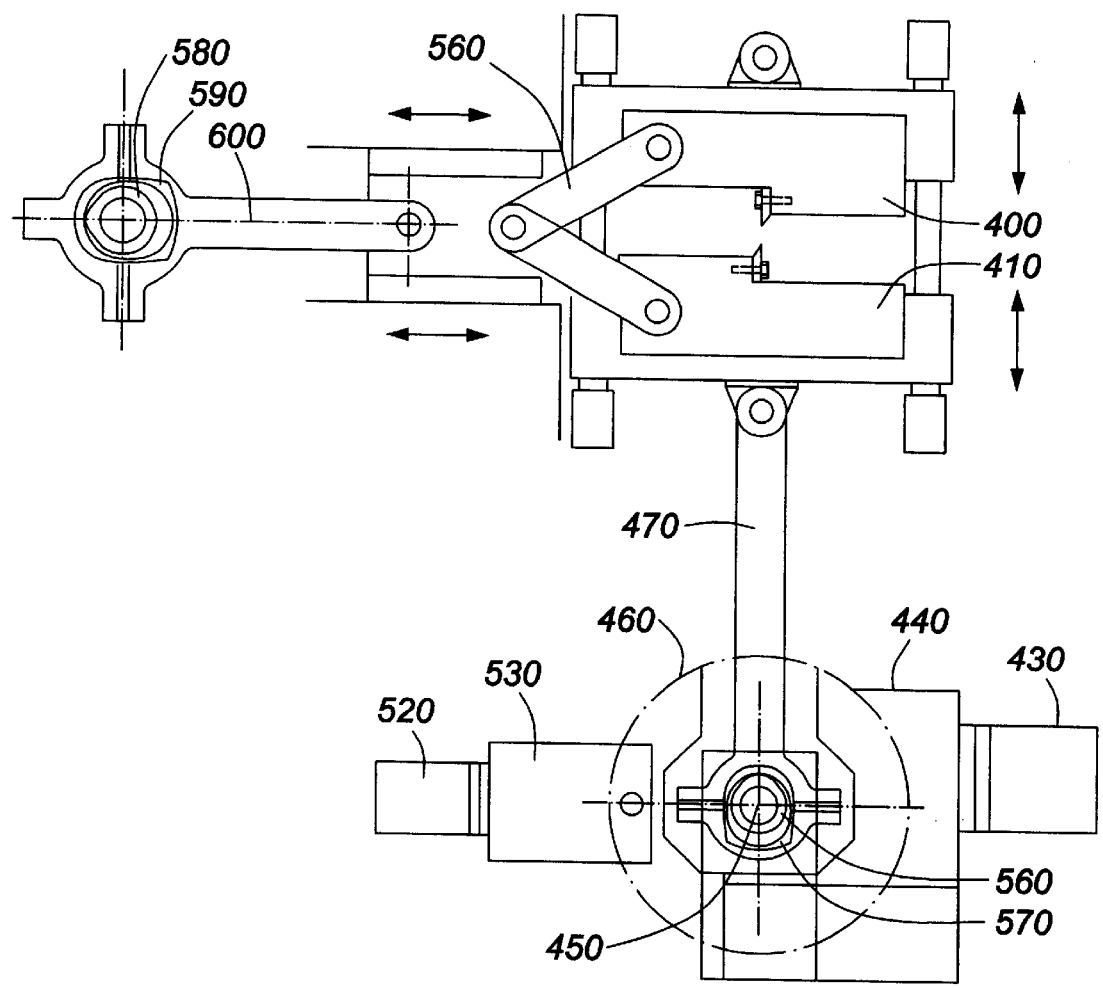
FIG. 7 shows a side view of a dual action shearing system with linear bridge motion implementing the drive system of the present invention.

FIG. 7 illustrates another application of the system employing dual cams for dual action intermittent motion generation. The first dual cam pair is resting on the first drive output shaft 450. Similar to FIGS. 5 and 6, the first cam is driven by the first drive motor 430 through the first gearbox, while the second cam is driven by the second drive motor 420 through the second gearbox 430. The first cam 560 and the second cam 570 produce a cam motion at one end of the Pitman arm 470. At the other end, the Pitman arm produces a linear motion that moves lower shear 410 into the upper shear 400. The upper shear 400 and lower shear 410 are attached to a toggle joint 560. At the other end of the toggle joint 560 is another intermittent motion generator. Again the intermittent motion generator consists of a first cam 580 nested within the cavity of the second cam 590. The dual cams permit the Pitman arm 600 to slide the toggle joint 560 and again motion the upper and lower shear 400 and 410 toward each other. Depending on the timing and synchronicity of the two sets of dual cams, the intermittent motion generators may both actuate linear motion in alternating periods. Alternatively, one intermittent motion generator may drive the shears together while the other motion generator retracts the shears from their cutting position.

Figure 8:
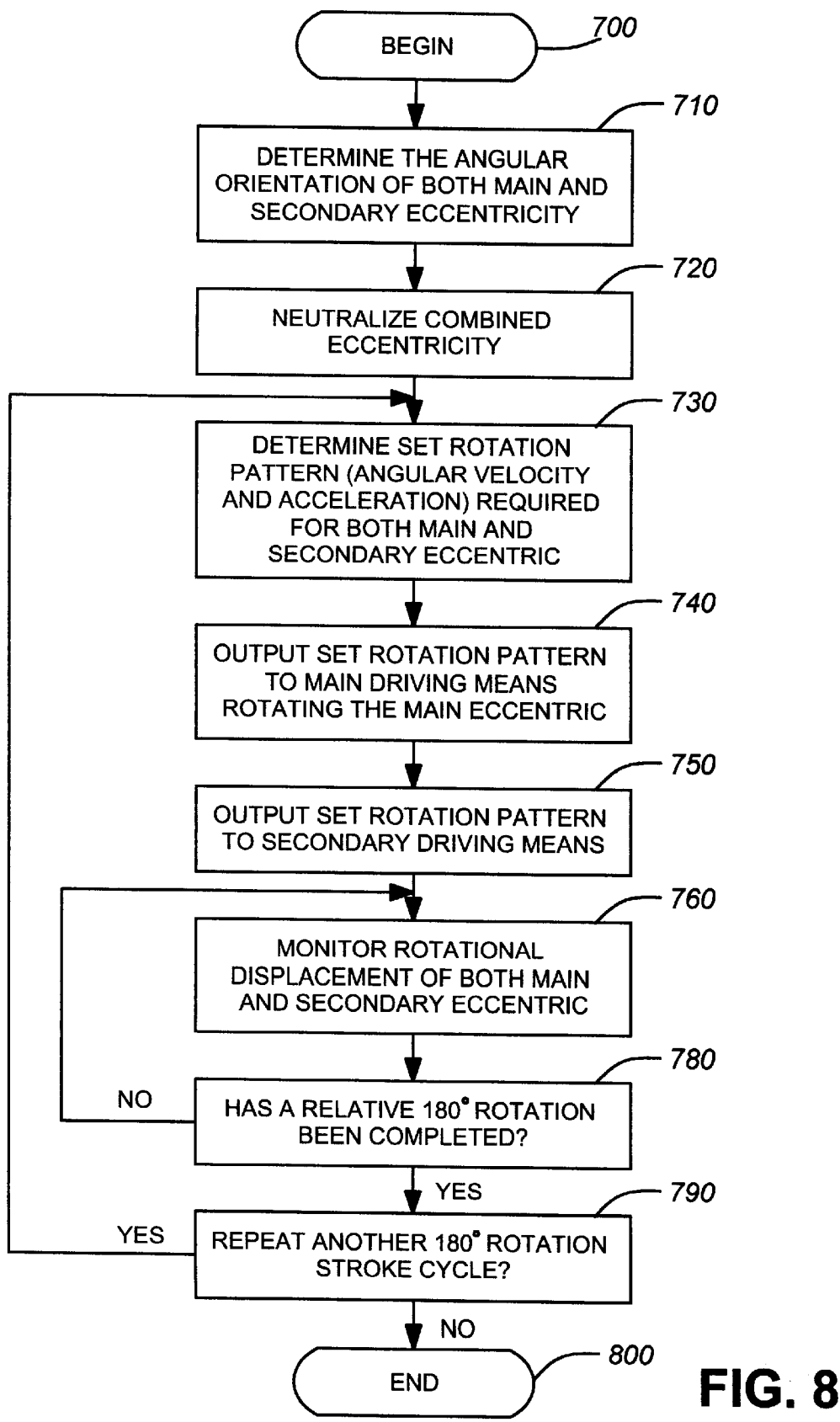
FIG. 8 is a flowchart detailing the process for controlling a dual cam according to the present invention.

FIG. 8 is a flowchart of a process for controlling the relative angular rotation of the dual cams. The process is controlled by a programmable logic controller (PLC). The PLC is essentially a special purpose computer aimed at implementing control systems. In the above-described embodiments, the PLC would likely have a series of inputs and outputs connected to the encoder as well as the drive motors and gearboxes. The process begins at step 700 and determines the angular rotation of both the first and second cam upon commencing the intermittent motion generation in step 710. The PLC, in step 720, then outputs signals to the gears connected to both the first and second cam to neutralize their respective positions. Neutralizing the positions refers to aligning the starting points of each of the cams. The next step 730 determines the set rotation pattern required for both the first cam and the second cam. The rotation pattern includes the required angular velocity of each cam, as well as the required acceleration of each. In step 740, the PLC then outputs the set rotation pattern to the first driving means responsible for driving the first cam. Step 750 outputs the set rotation pattern to the second driving means that is responsible for the second cam. Through use of the encoder, the PLC monitors the rotational displacement of both the first and second cam in step 760. The next step 780 determines if the relative 180° rotation has been completed. As each 180° relative rotation is completed the PLC signals the next 180° rotation in step 790. If the 180° has not been achieved then the PLC continues to monitor the cams in step 760. Otherwise the process continues with step 790 to determine whether to repeat another stroke cycle. If the same stroke cycle is not repeated, then the process ends at step 800. If the system continues to rotate another 180° relative rotation then the process returns to step 730.

A person understanding the above-described invention may now conceive of alternative designs, using the principles described herein. All such designs which fall within the scope of the claims appended hereto are considered to be part of the present invention.

I claim:

1. A system for intermittent motion generation for a cam follower, the system including:
   (a) a first cam coupled to a first driving means, the first cam rotating about a first fixed axis;
   (b) a second cam coupled to a second driving means, the second cam rotating about a second axis, the second cam having a cam-shaped cavity with the first cam being concentrically nested within the cavity such that the first cam is rotatable about an inner cam-shaped surface of the cam-shaped cavity and the first cam is completely surrounded by the second cam;
   (c) a cam follower having one end in contact with the second cam, the cam follower being linearly displaced due to an intermittent linear motion generated by a rotation of the second cam relative to a rotation of the first cam.

2. A drive system for generating intermittent motion, the drive system including:
   (a) first driving means;
   (b) first output shaft rotatably driven by the first driving means;
   (c) second driving means coupled to the first driving means;
   (d) a least two cams, the at least two cams including:
      d1) first cam rigidly mounted onto the first output shaft and having a cam-shaped outer surface;
      (d2) a second cam having a cam-shaped inner surface, the second cam being mounted onto the first cam by radial bearing means and the second cam completely surrounding the first cam such that the first cam is rotatable about the cam-shaped inner surface of the second cam, the radial bearing means being seated between the cam-shaped outer surface of the first cam and the cam-shaped inner surface of the second cam, the second cam being rotated by the second driving means;
   (e) a cam follower in contact with the outer surface of the second cam, the cam follower being displaced linearly by the intermittent linear motion generated from a relative rotation of the at least two cams.

3. A drive arrangement including a plurality of drive systems as defined in claim 2.

4. A drive arrangement including a plurality of drive systems as defined in claim 2, wherein at least two drive systems are coupled together to produce synchronized intermittent motion.

5. A drive arrangement including a plurality of drive systems as defined in claim 2, wherein a plurality a drive systems are coupled together to produce synchronized intermittent motion.

6. A system defined in claim 2, wherein the cam follower is a Pitman arm coupled to a first shear for engaging the first shear into a second shear.

* * * * *